(12) United States Patent
Nyfelt

(10) Patent No.: US 6,531,963 B1
(45) Date of Patent: Mar. 11, 2003

(54) METHOD FOR MONITORING THE MOVEMENTS OF INDIVIDUALS IN AND AROUND BUILDINGS, ROOMS AND THE LIKE

(75) Inventor: Leif Nyfelt, PL. 7304, Skövde (SE), SE-541 50

(73) Assignees: Jan Bengtsson, Askim (SE); Leif Nyfelt, Skovde (SE)

( * ) Notice: Subject to any disclaimer, the term of this patent is extended or adjusted under 35 U.S.C. 154(b) by 0 days.

(21) Appl. No.: 09/529,274

(22) PCT Filed: Mar. 17, 2000

(86) PCT No.: PCT/SE00/00530
§ 371 (c)(1),
(2), (4) Date: Apr. 11, 2000

(87) PCT Pub. No.: WO01/53852
PCT Pub. Date: Jul. 26, 2001

(30) Foreign Application Priority Data

Jan. 18, 2000 (SE) .............................................. 0000139

(51) Int. Cl.⁷ .............................................. G08B 23/00
(52) U.S. Cl. .................... 340/573.1; 340/539; 340/10.1
(58) Field of Search ............................ 340/573.1, 10.1, 340/825.34, 573.4, 539, 540, 541; 342/42, 44

(56) References Cited

U.S. PATENT DOCUMENTS

| | | | | |
|---|---|---|---|---|
| 3,864,662 A | * | 2/1975 | David et al. | 340/10.1 |
| 4,155,078 A | * | 5/1979 | Bowling et al. | 340/561 |
| 4,471,345 A | | 9/1984 | Barrett, Jr. | |
| 5,518,402 A | | 5/1996 | Tommarello et al. | |
| 5,640,157 A | * | 6/1997 | Langeraar | 340/984 |
| 5,977,913 A | | 11/1999 | Christ | |
| 6,031,454 A | * | 2/2000 | Lovejoy | 340/539 |
| 6,034,622 A | * | 3/2000 | Levine | 340/825.54 |
| 6,084,513 A | * | 7/2000 | Stoffer | 340/572.2 |
| 6,150,921 A | * | 11/2000 | Werb | 340/10.1 |

FOREIGN PATENT DOCUMENTS

| | | |
|---|---|---|
| DE | 197 08 841 | 9/1998 |
| GB | 2 223 380 | 4/1990 |

* cited by examiner

Primary Examiner—Anh La
(74) Attorney, Agent, or Firm—Young & Thompson

(57) ABSTRACT

A method for monitoring the movement of an individual in and around buildings, rooms and like areas. A transponder is arranged for coaction with an active antenna which is connected to a surveillance center either directly or indirectly, and the individual carries on his/her person either a transponder or an antenna, or one or more antennas or a plurality of transponders are placed in or around the building under surveillance.

16 Claims, 2 Drawing Sheets

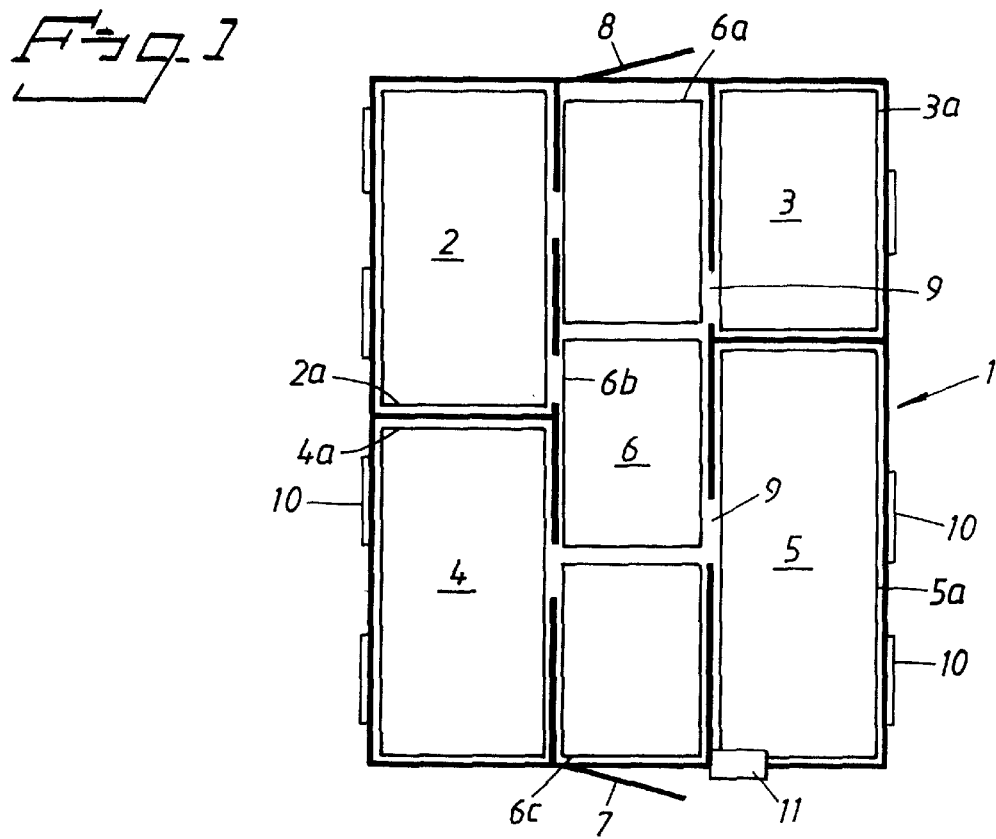
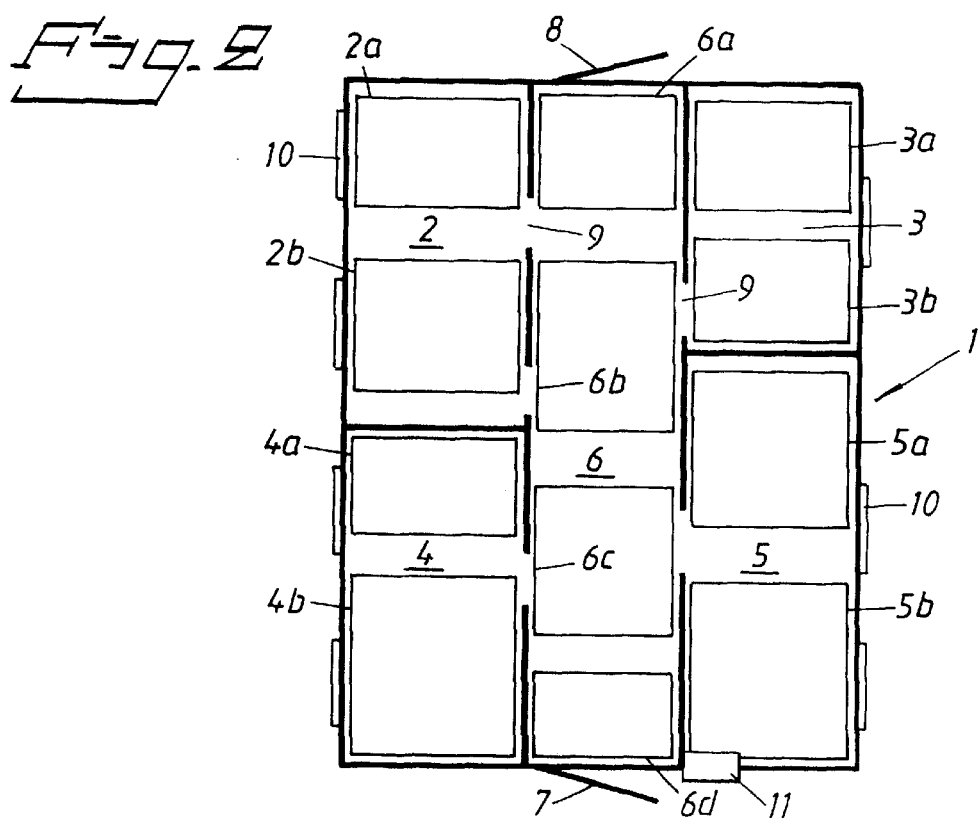

METHOD FOR MONITORING THE MOVEMENTS OF INDIVIDUALS IN AND AROUND BUILDINGS, ROOMS AND THE LIKE

BACKGROUND OF THE INVENTION

The present invention relates to a method of monitoring movements of an individual in and around buildings, rooms and like spaces, and in particular for monitoring movements of an individual during military or civil exercises.

DESCRIPTION OF THE RELATED ART

In respect of military exercises there exist systems by means of which movement of individuals, entire troops and/or vehicles can be monitored in the terrain. These surveillance systems are used to verify that patterns of movement that have been taught and practised are properly followed during exercises, and to be able to monitor how, e.g., soldiers move in battle exercises. These systems employ the use of GPS transmitters which enable, for instance, those commanding the exercise to follow the movements of the individuals/vehicles on computer, screens with the aid of signals received via satellites. One drawback with surveillance or monitoring systems of this kind is that they are extremely expensive, since each individual/vehicle must carry expensive positional equipment (a GPS transmitter). Another drawback is that the systems solely function out in the terrain. Neither do they have the accuracy desired. This accuracy deficiency is because data in the GPS system "hovers" and results in an uncertainty of about ±10 m in both the x and the y directions. This renders the system difficult to use in built-up areas where the relationship to the buildings in which the individual/vehicle is located cannot be established. Should the individual concerned then enter some other building, the level of uncertainty becomes still greater and it is not possible to determine positively whether the individual is moving within the building or not.

Consequently, the aforesaid method has been found unsuitable for monitoring movements of an individual within a building and consequently the use of video cameras with which movements of the individual can be followed on video monitors connected to the cameras has been relied upon in such cases. One drawback with this latter solution, however, is that the system does not register the individual scene on the video monitor. Another drawback is that the systems function inadequately or fail to function at all in darkness or in localities that are filled with smoke or water.

SUMMARY OF THE INVENTION

Accordingly, one object of the present invention is to provide a novel method of monitoring movements of an individual in a building or a room which will avoid the aforesaid drawbacks.

The object of the invention is achieved with an inventive method in which a transponder, e.g. a passive transponder, a so-called tag, coacts with an active antenna that is connected to a monitoring device either directly or indirectly, and in which the individual carries about his/her person either a transponder or an antenna, and in which one or more antennas or a number of transponders are placed in the building under surveillance.

By appropriate application, the inventive method enables the whereabouts of a specific individual in the building to be determined with centimetre accuracy, and also provides information as to whether the individual walks, creeps or crawls through the building.

Another object of the invention is to provide a method which enables individuals to be monitored in a built-up area and to see movements of the individual also outside and around the buildings.

This further object of the invention is achieved by placing active antennas in streets and like thoroughfares outside the buildings, and also on the actual buildings themselves.

Still another object of the invention is to enable hits achieved by weapons on buildings in the area to be simulated and to enable individuals located in the building to show that the building has been hit as a result of being fired upon.

This further object of the invention is achieved by arranging hit-identifying detectors that, e.g., register the effect of simulated hits on the building, and then activate simulation of damage to the building that is noticeable to the persons located in said building, for instance in the form of light signals and/or acoustic signals. The arrangement may also be such that the monitoring or surveillance system will also register the elimination of those people who were present in that part of the building in which a hit was registered.

BRIEF DESCRIPTION OF THE DRAWINGS

The invention will now be described in more detail with reference to non-limiting embodiments thereof and also with reference to the accompanying drawings, in which FIG. 1 is a schematic plan view of a building in which there has been installed a number of antennas for carrying out the inventive method;

FIG. 2 is a plan view corresponding to the view of FIG. 1 but with a different arrangement of antennas in the building;

DESCRIPTION OF THE PREFERRED EMBODIMENTS

Figure 3:
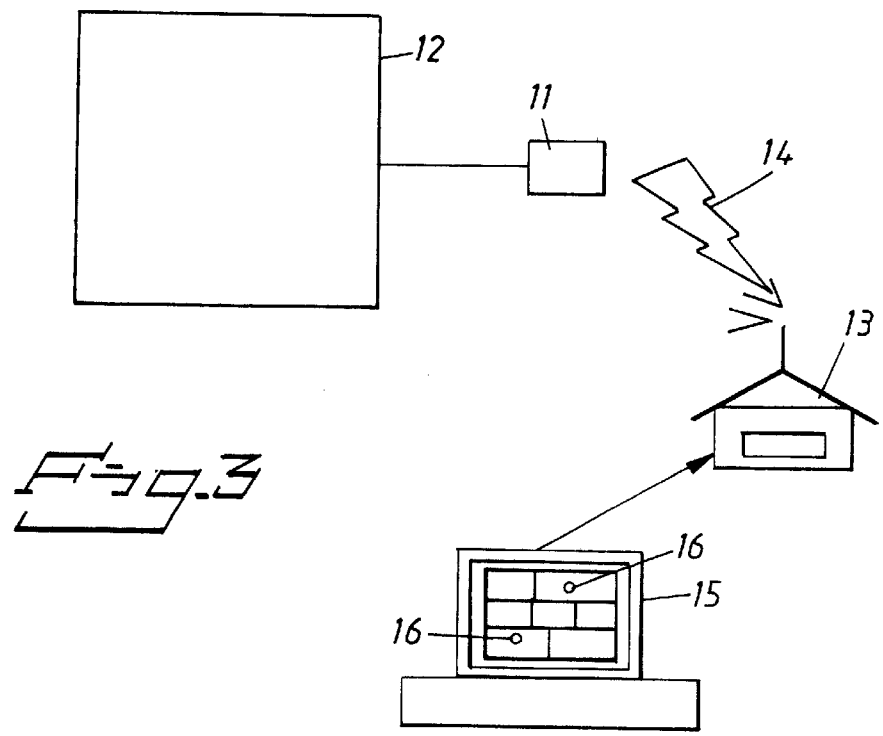
FIG. 3 illustrates the principle construction of an inventive monitoring or surveillance system.

As mentioned, FIG. 1 is a schematic plan view of a building 1. The building includes four rooms 2, 3, 4, 5 and an intermediate corridor 6. The corridor has at each end a respective entrance door 7, 8 and also door openings 9 that afford access to respective rooms from the corridor 6. The rooms have externally facing window openings 10. As the described building is conceived as being solely an exercise building, no windows are included in the window openings 10 nor yet inner doors in the door openings 9, although it will be understood that both windows and doors may be included in the building even when intended as an exercise building.

Each room 2–5 of the FIG. 1 embodiment has an antenna loop 2a, 3a, 4a, 5a installed therein, while three antenna loops 6a, 6b and 6c are installed in the corridor 6. The antenna loops are of the kind used in radio frequency surveillance equipment, so-called RFID antennas. Each of the antenna loops comprises active antennas that are coupled to a main unit/reader 11 which functions to switch to a registering/reading mode when an individual carrying a transponder, e.g. a passive element, a so-called tag, comes into the detection range of the active antenna. The main unit/reader 11 sends the registered information to a monitoring centre, as will be described in detail below in connection with the description of FIG. 3. The antenna loops 2a, 3a, 4a, 5a, 6a, 6b, 6c are preferably installed in the floor, or in the walls close to the floor of respective rooms, although said loops may alternatively be installed at other places in respective rooms such as to generally encircle said rooms or parts thereof. For instance, the antenna loops may alternatively be mounted in the ceilings of the rooms and corridor.

Although not shown in FIG. 1, antenna loops may also be installed around the window openings 10 or inner door openings 9, for instance, and also around the entrance door openings 7, 8. This enables the exact route by which an individual enters or leaves the building 1 to be registered.

FIG. 2 illustrates another embodiment of the antenna arrangement when practicing the inventive method, where the antenna loops in respective rooms have been divided into two parts. The antenna loops installed in room 2 of the FIG. 2 embodiment are referenced 2a and 2b, the antenna loops in room 3 are referenced 3a and 3b, the antenna loops in room 4 are referenced 4a and 4b, and the antenna loops in room 5 are referenced 5a and 5b. Four antenna loops 6a–6d are installed in the corridor 6. As a result of this division of the antenna loops, a signal is transmitted from the loop into which an individual carrying a transponder, a so-called tag, passes. The surveillance unit also enables that part of the room in which the individual carrying said transponder is situated to be seen. Naturally, it is possible to divide the rooms into still smaller units, with one antenna loop for each unit, so as to define the position of the individual more precisely.

The transponders, the so-called tags, carried by the individuals typically include a code which is specific for each transponder and which is forwarded by the active antenna so as to enable the individual passing into the detection range of the antenna loops concerned to be identified. By recording the transponder given to respective individuals, it is thus possible to follow the movements of each individual in the building 1 when the antenna loops are disposed in the manner described with reference to FIGS. 1 and 2. The individuals may carry several different transponders on their person, for instance one transponder on his/her foot, one transponder on his/her knee and one on his/her chest. When the antenna loops are able to detect a transponder within a range of solely one decimetre, the information obtained from the antenna loop will enable it to be seen whether the individual walks, creeps or crawls into the detection area of said loop. In this latter case, signals are received from all three transponders carried by the individual concerned, whereas if the person walks into said area, the only signal received is that transmitted by the foot-carried transponder. This enables the actions of the individual in the building to be monitored and controlled more effectively than when the individual carries only one single transponder that shows the presence of said individual in the room concerned.

As before mentioned, FIG. 3 shows the principle construction of a surveillance or monitoring system that employs the inventive method. The system includes an antenna loop 12 (corresponding to one of the loops a, b, c or d in FIG. 1 or FIG. 2) that is connected to a main unit/reader 11, which functions to forward to a monitoring centre 13 the information/data obtained through the medium of the antenna loop 12. The information/data can be transmitted from the main unit/reader 11 to the monitoring centre by cable or by radio 14, for instance. All information contained in the monitoring centre 13 can now be delivered to a computer for presentation of the movements carried out by the individuals in the building 1 on a screen 15, for instance in the form of a drawing of the building with points 16 marking the position of each individual in the building. Other information such as the name of each individual and the manner in which said individual moves in the building can be shown on the screen 15, by appropriate programming of the computer. The information shown on the screen may, of course, also be saved and later shown to those directly involved in the exercise, for an analysis of the result of said exercise.

Figure 4:
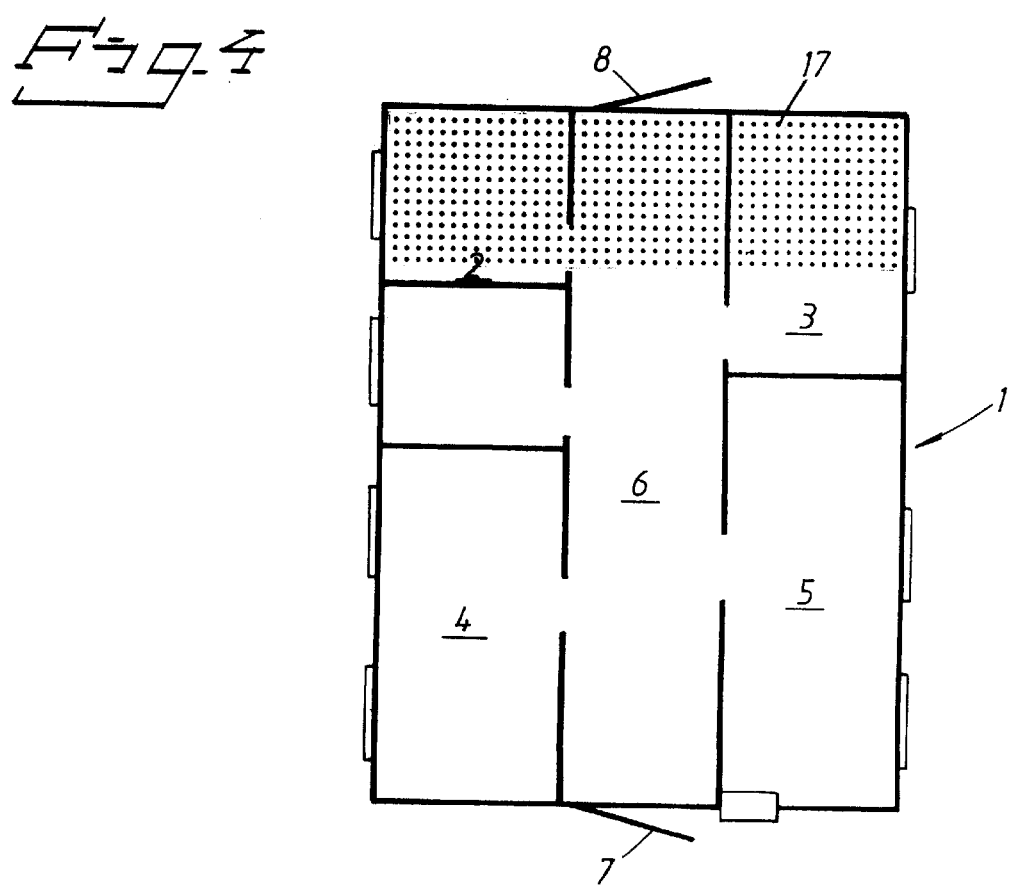
FIG. 4 is a view corresponding to the view of FIG. 1 but illustrating a variant of the inventive method where the passive elements have been placed in the building instead of being carried by the individuals.

FIG. 4 is a schematic plan view of a building 1 that includes four rooms 2, 3, 4, 5 and an intermediate corridor 6, corresponding to the building shown in FIGS. 1 and 2. Distinct from the embodiment illustrated in FIGS. 1 and 2, no antenna loops have been installed in the building in the FIG. 4 embodiment. Instead, a number of passive transponders 17, so-called tags, have been placed evenly over the floor of the building 1. The individuals taking part in the exercise in said building are instead equipped with detectors/antennas carried on their bodies (preferably on their shoes), said detectors/antennas suitably being interconnected with communication equipment carried by the individual concerned so as to enable signals to be sent from the antennas to the monitoring unit 13 for presentation in the aforedescribed manner.

The FIG. 4 embodiment enables a very precise indication to be obtained as to where each individual that has entered the building 1 is situated. The precision with which the movements of individuals can be followed will depend on the density in which the transponders have been placed on the floor/carpeting. A further advantage afforded by floor-mounted transponders is that they may be very small, e.g. have a diameter 10 mm and a thickness of 0.5 mm, which enables the transponders to be readily implemented in carpets, door sills, window frames, etc. This type of transponder has a useful life of about 50 years and can be walked upon.

The inventive method also enables simulation of a battle throughout an entire built-up area, i.e. not solely in a particular building but also within an entire town, city or the like. In such a case, active antennas may be positioned in a number of buildings in the town, and also in streets and other open places. The method will enable a person to be followed, or tracked, as he/she moves in the town, and also to follow the person when he/she enters a building, through the medium of antennas installed in said building. Antennas may also be mounted on the outside of the buildings, e.g. at corners of the buildings, and may also be mounted around the windows of said building, so as to register when a person passes outside the building.

By placing antennas also internally in the roof of the buildings, movement of a person on the roof of a building can also be followed in detail. Naturally, when the buildings include roof hatches or the like through which a person is able to enter the building, such entrances will also be provided with antennas around the entrance opening, so as to enable surveillance and registration of persons entering the building through such entrances.

There may also be found around the buildings in the town in question auxiliary devices such as ladders, for instance, which can be used by persons involved in the exercise to enter the buildings, or for some other purpose. Such auxiliary devices may also be equipped with transponders, so that movement of such devices will be registered. For instance, when a ladder is equipped with a transponder and raised against a window through which the person concerned can climb, this will be registered partly by the ladder being moved past antenna loops installed on the street and partly by an antenna loop installed around the window opening, whereby placing of the ladder against the window will be registered by virtue of the window antenna sensing the ladder-mounted transponder.

The buildings may also contain furniture and other objects that can be fitted with transponders, so that movement of the furniture and the objects in order to build barricades within the building can be noted and registered.

Hit recognition detectors may also be mounted on the town buildings, for instance detectors which register the effect of simulated hits on the building by military weapons with the aid of prisms. The prisms are then able to "register" hits achieved with artillery, tanks, mortars, and like weapons, and also hits achieved with hand-fired weapons. When the hit recognition detectors are also able to determine the type of weapon responsible for the hit on the basis of the hit signals, the system may also be programmed to cause hits on the building to activate both simulation of building damage discernible to persons present in the building, for instance to simulate fire, smoke, water, etc., and also to register elimination of those persons who occupied the part of the building concerned. Fire and smoke may be simulated by using a rotating yellow and red light, supplemented with smoke activation. A water leakage, due to a broken water pipe, for instance, can be simulated with the aid of water sprinklers that are activated in response to the registered "hit".

In addition to registering movement of an individual and his/her passage through doors and windows, the inventive method also enables registration of when a weapon is fired. Registration in this respect can be achieved by providing the weapon with an electric contact means which is coupled to the trigger mechanism of the weapon and when the trigger is pulled or cocked causes a tag/transponder to deliver a "firing code" that can be discerned and registered by the antenna loops in the room and therewith forward to the monitoring unit information to the effect that the weapon has been fired. This enables the weapon that was fired to be determined and also the number of times that this particular weapon has been fired. The weapon may also be fitted with a gyro or like means that enables the sighting of the weapon to be registered.

The practice hand grenades used in the exercise may be also fitted with a tag/transponder so that the path travelled by the hand grenade into the building, e.g. through a window, and also the place in the building where the hand grenade lands can also be registered with the aid of antenna loops positioned in accordance with the embodiment described with reference to FIG. 1 or FIG. 2. This information is forwarded by the antenna loop/main unit to the monitoring unit, where said information can be registered together with the affect of the grenade on those persons that may be present in the building. Such grenades may also include a "time delay", such that one code is transmitted from the grenade whilst it is still intact, and another code is sent after the grenade has "exploded", so that it can be ascertained whether or not the grenade was thrown at the right moment, and also whether or not persons that may have been present in the vicinity of the grenade were able to move to a safe location. The grenade may also be fitted with a transponder that emits one signal when the grenade is safe and another signal when the grenade has been armed.

Explosions can also be simulated by fitting dummy explosives, with transponders that deliver signals to antennas in their vicinity after having been positioned, in a manner corresponding to the aforegoing. Such dummy explosives may also be fitted with a "time delay" that can be activated when the dummy has been primed or fused and which causes the detonated dummy explosive to be registered with a delayed effect.

In conjunction with the aforementioned dummy explosives, shutters, hatchways, doors that are locked with electric locks for instance, and intended as the subject of an explosion exercise and that subsequent to priming a dummy explosive and triggering said dummy can be opened automatically so as to therewith simulate "true" explosions in cases where the persons carrying out the exercise are obstructed by the closed door and need to blow the door open on the one hand, and that also need to take cover in order not to be eliminated by the explosion. This latter manoeuvre may, of course, be controlled with the aid of antenna loops disposed in the floor around the hatch or door, so that each person located in the vicinity of the door at that time can be monitored.

The inventive method can also be used in contexts other than a military context. For instance, the method can be applied for more civil exercises, such as when training fire-fighters fitted with face masks, and riot police, where their movements in the building can be readily monitored.

The inventive method can also be used advantageously to evaluate the search result of so-called sniffer dogs. The inventive method is highly suited for monitoring movement of a dog and its search of a building, since the dog can be released into the building on its own and its movements within the building and its searching of the building can then be followed precisely on a computer screen.

The inventive method is very cost favourable in comparison with surveillance systems used hitherto, since each individual need only carry a transponder as opposed to needing to carry a radio and GPS transmitter in the case of the known systems, still let alone the accuracy inventive method. The inventive method requires the provision of solely one radio link, or fixed transmission line, and will accommodate practically an unlimited number of soldiers or other individuals.

The method also enables all data in a computer to be saved, so that the entire sequence of events can be gone through in detail with those persons involved in the exercise.

The software used to illustrate the exercise may be compiled to enable the exercise to be seen at several levels, for instance an overview of the entire town or city, an individual building, a room on the building, or to see down onto a level which includes a particular detail in the room.

The scenes may be illustrated in both two and three dimensions, depending on the costs laid down on programming the exercise.

What is claimed is:

1. A method of monitoring movements of an individual within a building, comprising the steps of:
    dividing the building into horizontal areas;
    encircling each of the horizontal areas with a horizontally-oriented active antenna loop;
    connecting the antenna loops to a surveillance center;
    providing the individual with a transponder that coacts with the antenna loops;
    determining that the individual is within a particular one of the horizontal areas based on the transponder coacting with the antenna loop encircling the particular one of the horizontal areas, wherein the individual is provided with plural transponders attached to the individual at different body heights, and whether the individual is standing or crawling is determined by the coaction of the plural transponders with one of the antennas.

2. The method of claim 1, wherein a corridor is divided into plural horizontal corridor areas and each of the plural corridor areas is encircled by a horizontally-oriented active antenna loop installed in a floor of the corridor.

3. The method of claim 2, wherein when the transponder becomes located within one of the corridor areas encircled by an antenna loop installed in the floor, the individual is identified as being located within that one of the corridor areas.

4. The method of claim 1, wherein plural of the horizontal areas are room areas having walls and the room areas encircled by horizontally-oriented active antenna loops installed in the walls.

5. The method of claim 1, wherein plural of the horizontal areas encircled by horizontally-oriented active antenna loops installed in ceilings over the horizontal areas.

6. The method of claim 5, wherein plural of the horizontally-oriented active antenna loops installed in a ceiling divide a room in plural horizontal areas.

7. The method of claim 6, wherein, vertically-oriented active antenna loops are installed around and associated with vertical openings within the building, and when the transponder coacts with the one of the vertically-oriented antenna loops, the individual is determined to have passed through the associated vertical opening.

8. The method of claim 7, wherein the route of the individual is tracked by the order in which the transponder coacts with the antennas.

9. The method of claim 1, wherein, the building includes rooms and a corridor, each of the rooms is encircled by at least one of the plural horizontal corridor areas installed in floors of the rooms, the corridor is encircled by a horizontally-oriented active antenna loop installed in a floor of the corridor.

10. The method of claim 9, wherein, vertically-oriented active antenna loops are installed around and associated with vertical openings within the building, and when the transponder coacts with the one of the vertically-oriented antenna loops, the individual is determined to have passed through the associated vertical opening.

11. The method of claim 1, comprising the further step of installing transponders on objects within the building in order to monitor the location of the objects.

12. The method of claim 11, wherein the objects are military exercise material.

13. The method of claim 1, wherein the antenna loops are connected to a main unit/reader sending data from the antenna loops to the surveillance center.

14. A method of monitoring movements of an individual within a building, comprising the steps of:

dividing the building into horizontal areas;

encircling each of the horizontal areas with a horizontally-oriented active antenna loop;

connecting the antenna loops to a surveillance center;

providing the individual with a transponder that coacts with the antenna loops;

determining that the individual is within a particular one of the horizontal areas based on the transponder coacting with the antenna loop encircling the particular one of the horizontal areas; and installing transponders on objects within the building in order to monitor the location of the objects;

wherein the objects are military exercise material, and wherein hit recognition detectors are installed in the building and are adapted to register simulated hits on the building, the detectors being interconnected to the antenna loops.

15. A method of monitoring movements of an individual within a building, comprising the steps of:

dividing the building into horizontal areas;

installing plural transponders throughout the building to define building locations;

connecting the plural transponders to a surveillance center;

providing the individual with at least one antenna;

connecting the at least one antenna to a surveillance center;

determining that the individual is within a particular one of the horizontal areas based on one of said plural transponders coacting with the at least one antenna.

16. The method of claim 15, wherein the individual carries plural antennas located at differing heights of the person; and determining whether the person is standing, prone or crawling based on plural antennas coacting each with one of the transponders.

* * * * *